(12) United States Patent
Demirkutlu et al.

(10) Patent No.: US 12,744,474 B2
(45) Date of Patent: Sep. 22, 2026

(54) SINGLE-PHASE, THREE-LEVEL, BUCK-BOOST INVERTER

(71) Applicant: ASELSAN ELEKTRONIK SANAYI VE TICARET ANONIM SIRKETI, Ankara (TR)

(72) Inventors: Eyyup Demirkutlu, Ankara (TR); Ires Iskender, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 67 days.

(21) Appl. No.: 18/869,309

(22) PCT Filed: Jun. 6, 2023

(86) PCT No.: PCT/TR2023/050531

§ 371 (c)(1),
(2) Date: Nov. 26, 2024

(87) PCT Pub. No.: WO2023/239330

PCT Pub. Date: Dec. 14, 2023

(65) Prior Publication Data

US 2026/0025088 A1 Jan. 22, 2026

(30) Foreign Application Priority Data

Jun. 10, 2022 (TR) .............................. 2022/009710

(51) Int. Cl.
*H02M 7/539* (2006.01)

(52) U.S. Cl.
CPC .................................. *H02M 7/539* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18;

(Continued)

(56) References Cited

U.S. PATENT DOCUMENTS 7,411,802 B2 8/2008 Victor et al.
10,250,159 B2 * 4/2019 Wang ................. H02M 7/5387

FOREIGN PATENT DOCUMENTS

CN 107809182 A 3/2018

OTHER PUBLICATIONS

Ashok Kumar, et al., Operating Modes based Review of Single-Stage Buck-Boost Inverters, IEEE, 2019, pp. 1904-1909.

(Continued)

*Primary Examiner* — Crystal L Hammond
*Assistant Examiner* — Nusrat Quddus
(74) *Attorney, Agent, or Firm* — Bayramoglu Law Offices LLC

(57) ABSTRACT

A transformerless, high efficiency, three-level, high power density, wide input voltage range, single-phase DC/AC inverter is provided. The inverter includes a single DC input power supply, a first semiconductor switch, a second semiconductor switch, a third semiconductor switch, a fourth semiconductor switch, a fifth semiconductor switch, a sixth semiconductor switch, a seventh semiconductor switch, an eighth semiconductor switch, a ninth semiconductor switch, a first inductor, and a second inductor.

3 Claims, 3 Drawing Sheets

(58) Field of Classification Search
CPC ... G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/073; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/04; H02M 7/00; H02M 3/1584; H02M 3/285; H02M 3/33561; H02M 7/49; H02M 1/045; H02M 7/006; H02M 7/06; H02M 7/068; H02M 7/153; H02M 1/088; H02M 7/103; H02M 7/106; H02M 7/19; H02M 7/08; H02M 7/17; H02M 2001/007; H02M 7/493; H02M 7/5381; H02M 7/483; H02M 7/53873; H02M 1/084; H02M 1/0845; H05B 39/048; B23K 11/24; H04B 2215/069; H02J 3/46; H02J 3/38
See application file for complete search history.

(56) References Cited

OTHER PUBLICATIONS

Ning Gao, et al., MOSFET-Switch-Based Transformerless Single-Phase Grid-tied Inverter for PV Systems, IEEE Journal of Emerging and Selected Topics in Power Electronics, 2022, pp. 3830-3839, vol. 10, No. 4.

Phani Kumar Chamarthi, et al., A Single Stage Doubly Grounded Transformerless Inverter Topology With Buck-Boost Voltage Capability for Grid Connected PV Systems, IEEE Transactions on Power Delivery, 2022, pp. 5044-5058, vol. 37, No. 6.

* cited by examiner

SINGLE-PHASE, THREE-LEVEL, BUCK-BOOST INVERTER

CROSS REFERENCE TO THE RELATED APPLICATIONS

This application is the national phase entry of International Application No. PCT/TR2023/050531, filed on Jun. 6, 2023, which is based upon and claims priority to Turkish Patent Application No. 2022/009710, filed on Jun. 10, 2022, the entire contents of which are incorporated herein by reference.

TECHNICAL FIELD

The invention relates to a single-phase, three-level buck-boost inverter.

In particular, the invention relates to transformerless single-phase buck-boost inverter for obtaining single-phase alternating current (AC) output voltage from direct current (DC) input power source.

BACKGROUND

The electrical energy taken from the regulated or unregulated DC voltage/current source is converted into AC voltage/current via inverters with or without transformer and transferred to the grid or to the load independent from the grid. Transformer inverters provide galvanic isolation between DC input source and AC output and can suppress leakage currents originating from DC input source. Transformerless inverters are disadvantageous in terms of volume, weight, efficiency and cost. In transformerless inverters, the cost, volume and weight are reduced by removing the transformer from the system, and the efficiency is increased by reducing the transformer-induced power losses. Various power converter topologies, switching strategies and filtering methods so as to suppress the leakage currents drawn from the input power supply in transformerless inverters, are taken into consideration.

Inverters with wide input voltage range are preferred so as to minimize the effect of large changes in input DC voltage on output AC voltage. In case the input DC voltage level is lower than the peak value of the AC voltage desired at the output, the inverter is expected to show boost feature, If the input DC voltage level is higher than the output AC voltage peak value, it is expected to show a buck feature.

As a result of the research made on the subject, U.S. Pat. No. 7,411,802B2 is encountered. The application describes a method of converting a direct current voltage from a direct current voltage source, in particular, a photovoltaic direct current voltage source, to an alternating current voltage. However, there is no mention of a transformerless, high-efficiency, three-level, high power density, wide input voltage range, single-phase three-level, buck-boost DC/AC inverter structure.

As a result, due to the abovementioned disadvantages and the insufficiency of the current solutions regarding the subject matter, a development is required to be made in the relevant technical field.

SUMMARY

The present invention aims to solve the abovementioned disadvantages by being inspired from the current conditions.

The main object of the present invention is to prevent capacitive leakage currents from flowing to the output from DC voltage sources.

Another object of the present invention is to provide voltage boosting, voltage reducing and converting alternating current into voltage form functions with a single direct current source at the input.

Another object of the present invention is to obtain a single-phase AC output voltage from a DC input power source within the scope of a buck-boost inverter.

Another object of the present invention is to provide a regulated and stable AC voltage at the output against wide voltage changes at the inverter input.

In order to fulfill the above-described purposes, the present invention is a transformerless, high-efficiency, three-level, high power density, wide input voltage range, single-phase three-level, buck-boost DC/AC inverter, characterized by including a transformerless single-phase buck-boost inverter, which is with high power density, provides single-phase AC output voltage, includes T1 semiconductor switch that prevents capacitive leakage currents from flowing from the DC input power source to the output.

The structural and characteristic features of the present invention will be understood clearly by the following drawings and the detailed description made with reference to these drawings and therefore the evaluation shall be made by taking these figures and the detailed description into consideration.

DESCRIPTION OF THE PART REFERENCES

Figures 1, 2, 3:
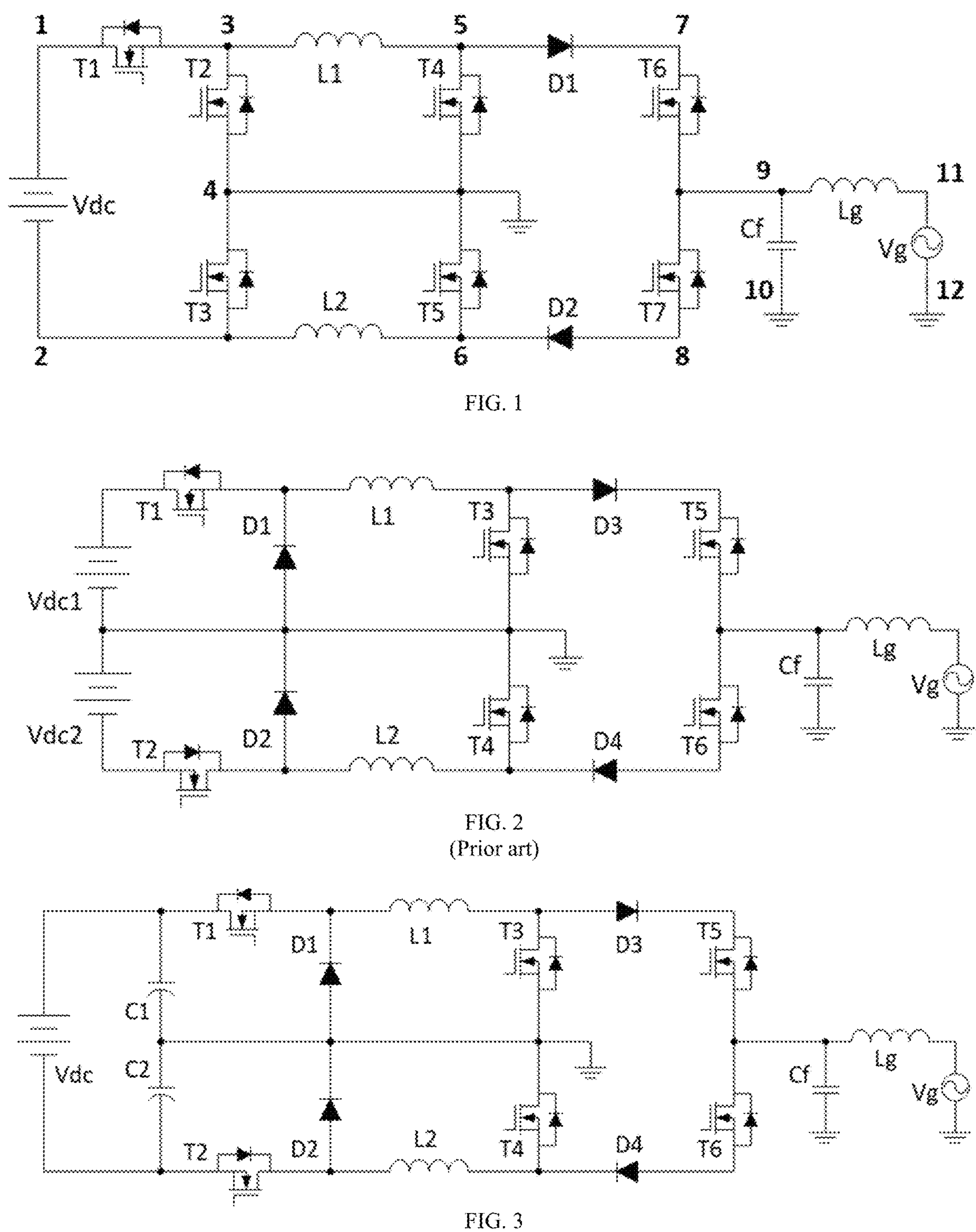
FIG. 1 is an illustrative view of the single-phase, three-level, buck-boost inverter, which is the subject of the invention.
FIG. 2 is an illustrative view of the state of the art.
FIG. 3 is an illustrative view of the state of the art.

1: First terminal
2: Second terminal
3: Third terminal
4: Fourth terminal
5: Fifth terminal
6: Sixth terminal
7: Seventh terminal
8: Eighth terminal
9: Ninth terminal
10: Tenth terminal
11: Eleventh terminal
12: Twelfth terminal
T1, T2, T3, T4, T5, T6, T7, T8: Semiconductor switch
Vdc, $Vdc_1$, $Vdc_2$: DC power supply
L1, L2, Lg: Inductor
D1, D2, D3, D4: Semiconductor switch (Diode)
Cf, C1, C2: Capacitor
Vg: Output AC voltage

501: DC input power supply
502: First semiconductor switch
503: Second semiconductor switch
504: Third semiconductor switch
506: Fourth semiconductor switch
507: Fifth semiconductor switch
510: Sixth semiconductor switch
511: Seventh semiconductor switch
505: First inductor
508: Second inductor
509: Eighth semiconductor switch (Diode)
512: Ninth semiconductor switch (Diode)
513: Capacitor
514: Inductor
515: AC output voltage

DETAILED DESCRIPTION OF THE EMBODIMENTS

In this detailed description, the preferred embodiments of the inventive single-phase, three-level, buck-boost inverter are described by means of examples only for clarifying the subject matter.

A transformerless, high-efficiency, three-level, high power density, wide input voltage range, single-phase three-level, buck-boost DC/AC inverter without DC link capacitor, the inverter includes: a single DC input power supply (501) connected between a first terminal (1) and a second terminal (2); a first semiconductor switch (502) connected between the first terminal (1) and a third terminal (3); a second semiconductor switch (503) connected between the third terminal (3) and a fourth terminal (4) connected to ground; a third semiconductor switch (504) connected between the second terminal (2) and the fourth terminal (4); a first inductor (505) connected between the third terminal (3) and a fifth terminal (5); a second inductor (508) connected between the second terminal (2) and a sixth terminal (6); a fourth semiconductor switch (506) connected between the fifth terminal (5) and the fourth terminal (4); a fifth semiconductor switch (507) connected between the sixth terminal (6) and the fourth terminal (4); a sixth semiconductor switch (510) and an eighth semiconductor switch (509) serially connected between the fifth terminal (5) and a ninth terminal (9); a seventh semiconductor switch (511) and a ninth semiconductor switch (512) serially connected between the sixth terminal (6) and the ninth terminal (9); among which semiconductor switches at most two of the semiconductors are switched at high-frequency at the same time, wherein at least the first semiconductor switch (502), the second semiconductor switch (503), the third semiconductor switch (504), the fourth semiconductor switch (506), the fifth semiconductor switch (507), the sixth semiconductor switch (510) and the seventh semiconductor switch (511) are metal-oxide-semiconductor field-effect transistor (MOSFET) or insulated-gate bipolar transistor (IGBT);

a driving control means configured to operate the first semiconductor switch (502) and the second semiconductor switch (503) at high frequency, maintain the third semiconductor switch (504), the fifth semiconductor switch (507), the sixth semiconductor switch (510) and the eighth semiconductor switch (509) at ON state and maintain the fourth semiconductor switch (506), the seventh semiconductor switch (511) and the ninth semiconductor switch (512) at OFF state in a positive half-cycle of a buck mode of the inverter, operate the first semiconductor switch (502) and the third semiconductor switch (504) at high frequency, maintain the second semiconductor switch (503), the fourth semiconductor switch (506), the seventh semiconductor switch (511) and the ninth semiconductor switch (512) at ON state and maintain the fifth semiconductor switch (507), the sixth semiconductor switch (510) and the eighth semiconductor switch (509) at OFF state in a negative half-cycle of the buck mode of the inverter, operate the fourth semiconductor switch (506) and the eighth semiconductor switch (509) at high frequency, maintain the first semiconductor switch (502), the fifth semiconductor switch (507) and the sixth semiconductor switch (510) at ON state and maintain the second semiconductor switch (503), the third semiconductor switch (504), the seventh semiconductor switch (511) and the ninth semiconductor switch (512) at OFF state in a positive half-cycle of a boost mode of the inverter, operate the fifth semiconductor switch (507) and the ninth semiconductor switch (512) at high frequency, maintain the first semiconductor switch (502), the fourth semiconductor switch (506) and the seventh semiconductor switch (511) at ON state and maintain the second semiconductor switch (503), the third semiconductor switch (504), the sixth semiconductor switch (510) and the eighth semiconductor switch (509) at OFF state in a negative half-cycle of the boost mode of the inverter and turn the first semiconductor switch (502) OFF in zero crossing regions of AC voltage at the output to prevent capacitive leakage currents from flowing from the DC input power source (501) to an output.

It is possible for capacitive leakage currents to flow to the output from DC voltage sources with a large surface area such as solar panels. In circuit structures before a single-phase, three-level, buck-boost inverter, capacitive leakage currents originating from the input source are prevented by separating DC input terminals and output terminals. In a single-phase, three-level buck-boost inverter, DC input terminals (the first terminal (1), the second terminal (2)) and output terminals (the eleventh terminal (11), the twelfth terminal (12)) are separated to prevent capacitive leakage currents originating from the input source (501). In addition to this feature, the midpoint needed between the first terminal (1) and the second terminal (2) at the input is no longer needed with the help of a single-phase, three-level, buck-boost inverter. Voltage boosting, voltage reducing and converting alternating current into voltage form functions are possible with a single direct current source at the input with the help of a single-phase, three-level, buck-boost inverter. A single-phase, three-level, buck-boost inverter does not include any electrolytic capacitors in the topology. Since the input can be fed directly from a single source, there is no need to customize the inverter input. Since there are no series-connected electrolytic capacitors at the inverter input, there is no need for a balancing algorithm.

A transformerless single-phase buck inverter is provided for obtaining single-phase AC output voltage (515) from DC input power source (501) within the scope of a single-phase, three-level, buck-boost inverter.

The circuit structure presented as a single-phase, three-level, buck-boost inverter is shown in FIG. 1. A transformerless inverter is developed that is fed from a direct current source (501) connected to its terminals (the first terminal (1), the second terminal (2)) in FIG. 1) and generates an output voltage (515) in the form of a single-phase alternating current sine wave at its terminals between the eleventh terminal (11) and the twelfth terminal (12) within the scope of a single-phase, three-level, buck-boost inverter. Output filter is located between the ninth terminal (9) and the tenth terminal (10) and between the eleventh terminal (11) and the twelfth terminal (12). Active switches, passive diodes and inductors are located between the first terminal (1), the second terminal (2) and the ninth terminal (9), the tenth terminal (10). A single-phase, three-level, buck-boost inverter is an inverter with a wide input voltage range since it has both buck and boost features. A single-phase, three-level buck-boost inverter is an inverter with high power density, as it does not contain an electrolytic capacitor and has at most two high-frequency switched semiconductors at the same time.

The single-phase transformerless inverter in FIG. 2 has buck and boost features. A regulated and stable AC voltage can be obtained at the output against wide voltage changes at the inverter input. The leakage currents originating from the DC input source can be suppressed with the help of the appropriate switching strategy. On the other hand, the upper DC power supply powers the output in regions where the output voltage is positive, while the lower DC power supply powers the output in regions where the output voltage is negative. Although the topology has buck and boost features, the need for separate input power supplies for positive and negative half-cycles causes the input voltage utilization rate to decrease.

FIG. 3 shows a buck-boost inverter fed from a single DC voltage source. In this inverter structure, which has a higher input voltage utilization rate than the inverter in FIG. 2, power flow in positive and negative half-cycle is provided by using two series capacitors instead of two DC power supplies at the input. It is important in this inverter structure that the voltages on the series capacitors at the input in this inverter structure are balanced, so that the output AC voltage is stable and regulated. High currents flowing through the capacitors cause the capacitors to be large in size. Although the inverter in FIG. 3 is a transformerless inverter, the capacitors in its structure cause the volume of the inverter to increase and the power density to decrease.

In the inverter shown in FIG. 2, the need for two direct current sources at its input creates a necessity for voltage balancing between sources. This situation leads to the customization of the system at the entrance according to the topology.

In the inverter shown in FIG. 3, although a single source is used at the input, two series electrolytic capacitors are needed. Additional control algorithms must be applied to keep the voltages of the electrolytic capacitors in balance in this inverter. Electrolytic capacitors not only increase the size of the circuit, but also limit the lifetime of the product.

Figure 4:
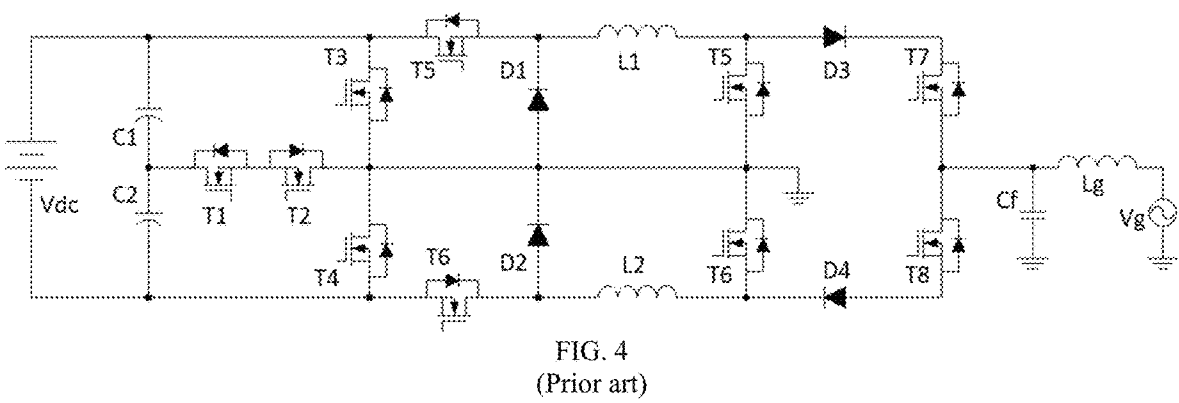
FIG. 4 is an illustrative view of the state of the art.

The inverter in FIG. 4 solves the problem of using large electrolytic capacitors in the inverter in FIG. 3. The current passing through the capacitors is reduced and the size of the capacitors can be reduced with the help of T1, T2, T3 and T4 semiconductor switches added to the input. However, this inverter uses four additional switches, increasing the cost and complicating the control algorithm.

Figure 5:
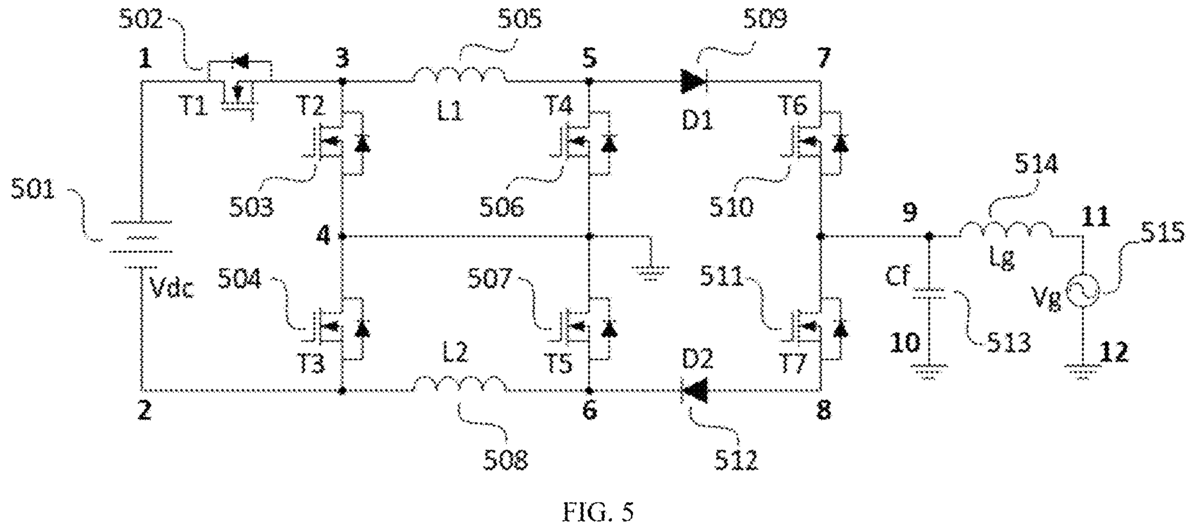
FIG. 5 is an illustrative view of the single-phase, three-level, buck-boost inverter, which is the subject of the invention.

The single-phase inverter, which is considered in a single-phase, three-level, buck-boost inverter structure, is shown in FIG. 5 together with the numbers of the materials used.

Figure 6:
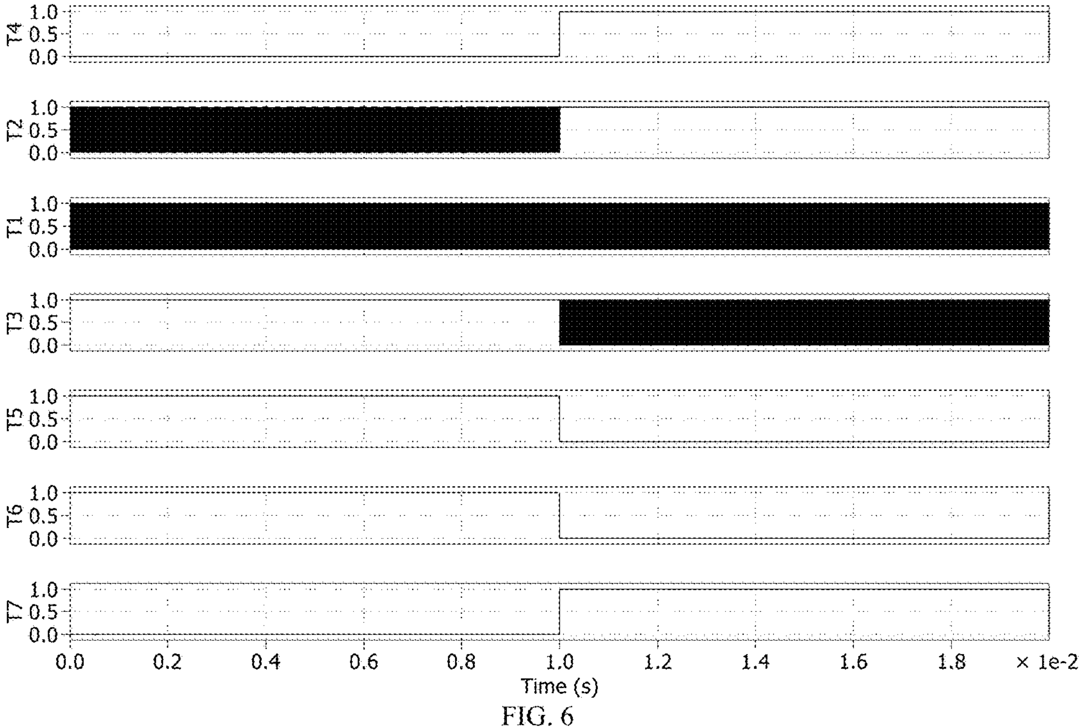
FIG. 6 is an illustrative view of the switching signals when the peak value of the output voltage subject to the invention is lower than the input voltage.

In the case where the voltage level of the DC input power supply (501) is higher than the peak value of the output AC voltage (515) (FIG. 6); a sine wave shape of the output voltage is formed with the DC/DC buck converter including the first semiconductor switch (502), the second semiconductor switch (503) and the first inductor (505) in the positive half-cycle of the output voltage. In the positive half cycle of the output voltage, the sixth semiconductor switch (510) is on, the seventh semiconductor switch (511) is off.

In the case where the voltage level of the DC input power supply (501) is higher than the peak value of the output AC voltage (FIG. 6); in the negative half-cycle of the output voltage, it is formed by the DC/DC buck converter including the first semiconductor switch (502), the third semiconductor switch (504) and the second inductor (508). In this case, the fourth semiconductor switch (506), the fifth semiconductor switch (507) are off, and the eighth semiconductor switch (509) and the ninth semiconductor switch (512) are on. In the negative half cycle of the output voltage, the sixth semiconductor switch (510) is off, the seventh semiconductor switch (511) is on.

In the case where the voltage level of the DC input power supply (501) is higher than the peak value of the output AC voltage; the inverter operates in buck mode in order to generate the output voltage in sine wave form.

Figure 7:
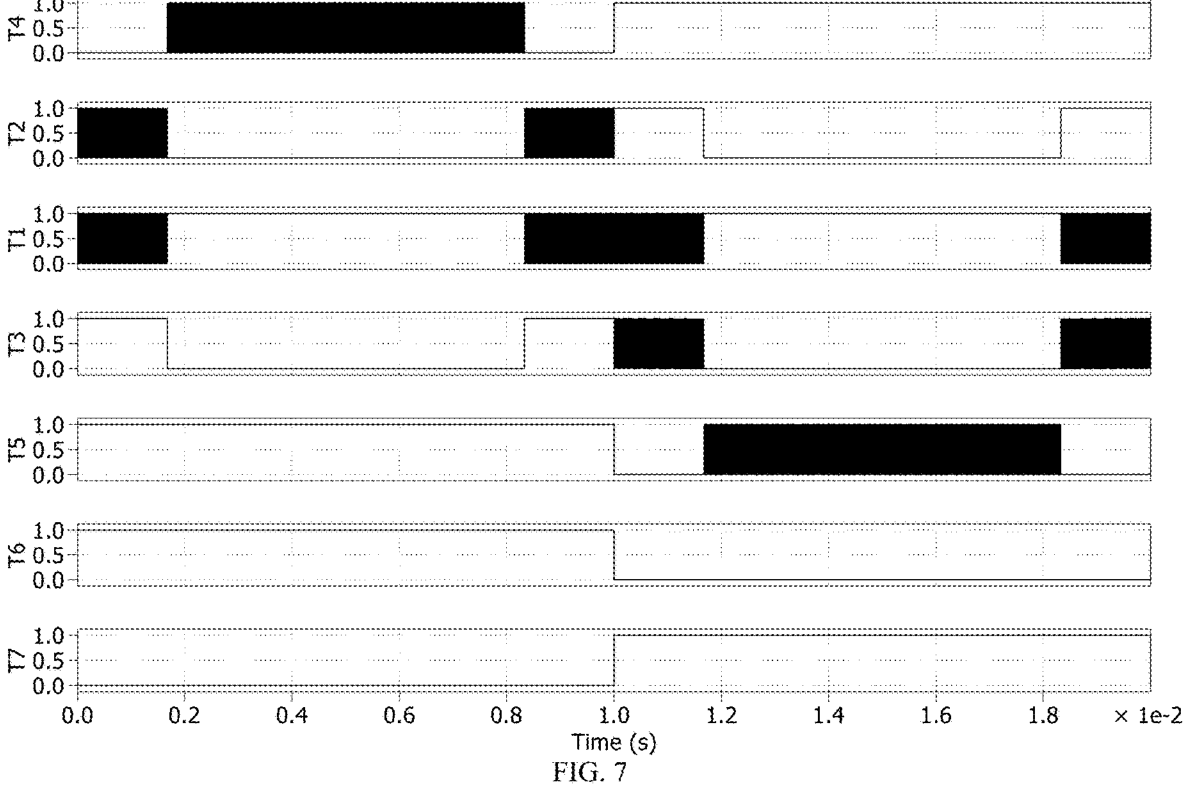
FIG. 7 is an illustrative view of the switching signals when the peak value of the output voltage subject to the invention is higher than the input voltage.

In the case where the voltage level of the DC input power supply (501) is lower than the peak value of the output AC voltage (FIG. 7); in the positive half cycle of the output voltage, in the regions where the output AC voltage is lower than the DC input voltage level, the voltage waveform is created with the DC/DC buck converter including the first semiconductor switch (502), the second semiconductor switch (503) and the first inductor (505). In regions where the output AC voltage is higher than the DC input voltage level, the voltage waveform is created with the DC/DC boost converter including the first inductor (505), the fourth semiconductor switch (506) and the eighth semiconductor switch (509). In the positive half cycle of the output voltage, the sixth semiconductor switch (510) is on, the seventh semiconductor switch (511) is off.

In the case where the voltage level of the DC input power supply (501) is lower than the peak value of the output AC voltage (FIG. 7); in the negative half cycle of the output voltage, in the regions where the absolute value of the output AC voltage is lower than the DC input voltage level, the voltage waveform is created with the DC/DC buck converter consisting of the first semiconductor switch (502), the third semiconductor switch (504) and the second inductor (508). In regions where the output AC voltage is higher than the absolute value of the DC input voltage level, voltage waveform is created with DC/DC boost converter consisting of the second inductor (508), the fifth semiconductor switch (507) and the ninth semiconductor switch (512). In the negative half cycle of the output voltage, the sixth semiconductor switch (510) is off, the seventh semiconductor switch (511) is on.

In the case where the voltage level of the input DC power supply (501) is lower than the peak value of the output AC voltage; in order to create the output voltage in sine wave form, the inverter operates in buck mode for regions below the output AC voltage (515) and DC input power supply (501) voltage level. The inverter operates in boost mode for regions above the output AC voltage (515) and DC input power supply (501) voltage level.

While the inverter is operating in buck mode, the first semiconductor switch (502), the second semiconductor switch (503) are switched at high frequency (in the 1 kHz-1 MHz band range) in the positive half-cycle of the output voltage, the third semiconductor switch (504), the fifth semiconductor switch (507), the sixth semiconductor switch (510) and the eighth semiconductor switch (509) are in conduction and the fourth semiconductor switch (506), the seventh semiconductor switch (511) and the ninth semiconductor switch (512) are in cutoff.

While the inverter is operating in buck mode, the first semiconductor switch (502), the third semiconductor switch (504) are switched at high frequency (1 kHz-1 MHz band) in the negative half-cycle of the output voltage, the second semiconductor switch (503), the fourth semiconductor switch (506), the seventh semiconductor switch (511) and the ninth semiconductor switch (512) are in conduction and the fifth semiconductor switch (507), the sixth semiconductor switch (510) and the eighth semiconductor switch (509) are in cutoff.

While the inverter is operating in boost mode, the fourth semiconductor switch (506) and the eighth semiconductor switch (509) are switched at high frequency (1 kHz-1 MHz band range) in the positive half cycle of the output voltage, the first semiconductor switch (502), the fifth semiconductor switch (507), the sixth semiconductor switch (510) are in conduction and the second semiconductor switch (503), the third semiconductor switch (504), the seventh semiconductor switch (511) and the ninth semiconductor switch (512) are in cutoff.

While the inverter is operating in the boost mode, the fifth semiconductor switch (507) and the ninth semiconductor switch (512) are switched at high frequency (1 kHz-1 MHz band) in the negative half-cycle of the output voltage, the first semiconductor switch (502), the fourth semiconductor switch (506), the seventh semiconductor switch (511) are in conduction and the second semiconductor switch (503), the third semiconductor switch (504), the sixth semiconductor switch (510) and the eighth semiconductor switch (509) are in cutoff.

The capacitor (513) and the inductor (514) are used to filter the transfer of high-frequency components generated by the inverter, which is considered within the scope of a single-phase, three-level, buck-boost inverter.

The prevention of high-frequency leakage capacitive currents instantaneous drawn from the input power source in the zero crossing regions of the output AC voltage is provided by the first semiconductor switch (502) in a single-phase, three-level, buck-boost inverter. The first semiconductor switch (502) turns off and the electrical connection between the input terminals and the output terminals is interrupted in the zero crossing regions of the output voltage. Thus, the problem of capacitive leakage current drawn from the input DC power source (501), which occurs in transformerless inverters, is suppressed by the present invention.

The fact that a single-phase, three-level, buck-boost inverter has two semiconductor switches switched at high frequency in one switching period ensures that the thermal power losses due to switching are low.

Switching two different switches at high frequency in the positive and negative cycles of the output AC voltage and in the operating periods in the buck-boost mode depending on whether the output AC voltage is lower or higher than the input DC voltage ensures the distribution of the thermal load on the heatsink.

There is no need to connect a single or two electrolytic capacitors in series to the input terminals of the transformerless inverter structure with the help of the single-phase, three-level, buck-boost inverter. Thus, the total volume of the inverter decreases and the power density increases with the deactivation of the electrolytic capacitors. In general, the fact that electrolytic capacitors do not have a long lifespan also causes a short lifespan of power converters that need electrolytic capacitors. In this context, the inverter introduced with the present invention, which does not need electrolytic capacitors, has a long life.

The first semiconductor switch (502), the second semiconductor switch (503), the third semiconductor switch (504), the fourth semiconductor switch (506), the fifth semiconductor switch (507), the sixth semiconductor switch (510) and the seventh semiconductor switch (511) in a single-phase, three-level, buck-boost inverter structure can be used as MOSFET, IGBT in Silicon or Silicon Carbide technology. The reverse parallel diode, which can be found in the switch, can be added externally.

The eighth semiconductor switch (509) and the ninth semiconductor switch (512), which are diodes contained in a single-phase, three-level, buck-boost inverter structure, can be used in Silicon or Silicon Carbide technology.

MOSFET is used as IGBT in Silicon or Silicon Carbide technology instead of the diodes which are the eighth semiconductor switch (509) and the ninth semiconductor switch (512) in a single-phase, three-level, buck-boost inverter structure. Thus, thermal losses on these switches can be reduced. In addition, the inverter can operate in two directions by using controllable semiconductors instead of the diodes. The inverter, which can convert input DC voltage to output AC voltage, can also convert single phase AC voltage to regulated DC voltage.

A single-phase, three-level, buck-boost inverter converts the DC input voltage taken from the solar panel or DC power source or battery to a single phase AC voltage, allows the same to be used for feeding electronic equipment or for transferring energy to the grid.

AC voltage obtained from the network, alternator or turbine is used for charging batteries or feeding DC electronic loads.

Since a single-phase, three-level, buck-boost inverter can operate in two directions, it is used in the conversion of non-regulated AC voltages obtained from wind turbines to regulated DC output voltage, and in battery charging units of electric vehicles.

The inverter revealed within the scope of a single-phase, three-level, buck-boost inverter is used in renewable energy, military land/sea/air vehicles, rail systems, medical devices, electric vehicle applications.

A single-phase, three-level, buck-boost inverter and a transformerless, high-efficiency, three-level, high power density, wide input voltage range, single-phase DC/AC inverter are provided.

What is claimed is:

1. A transformerless, high-efficiency, three-level, high power density, wide input voltage range, single-phase three-level, buck-boost direct current (DC)/alternating current (AC) inverter without a DC link capacitor, comprising: a single DC input power supply connected between a first terminal and a second terminal; a first semiconductor switch connected between the first terminal and a third terminal; a second semiconductor switch connected between the third terminal and a fourth terminal connected to ground; a third semiconductor switch connected between the second terminal and the fourth terminal; a first inductor connected between the third terminal and a fifth terminal; a second inductor connected between the second terminal and a sixth terminal; a fourth semiconductor switch connected between the fifth terminal and the fourth terminal; a fifth semiconductor switch connected between the sixth terminal and the fourth terminal; a sixth semiconductor switch and an eighth semiconductor switch serially connected between the fifth terminal and a ninth terminal; a seventh semiconductor switch and a ninth semiconductor switch serially connected between the sixth terminal and the ninth terminal; wherein at most two semiconductors are switched at high-frequency simultaneously, wherein at least the first semiconductor switch, the second semiconductor switch, the third semiconductor switch, the fourth semiconductor switch, the fifth semiconductor switch, the sixth semiconductor switch, and the seventh semiconductor switch are a metal-oxide-semiconductor field-effect transistor (MOSFET) or an insulated-gate bipolar transistor (IGBT);

a driving control means configured to operate the first semiconductor switch and the second semiconductor switch at a high frequency, maintain the third semiconductor switch, the fifth semiconductor switch, the sixth semiconductor switch, and the eighth semiconductor switch at an ON state and maintain the fourth semiconductor switch, the seventh semiconductor switch, and the ninth semiconductor switch at an OFF state in a positive half-cycle of a buck mode of the transformerless, high-efficiency, three-level, high power density, wide input voltage range, single-phase three-level, buck-boost DC/AC inverter without the DC link capacitor, operate the first semiconductor switch and the third semiconductor switch at the high frequency, maintain the second semiconductor switch, the fourth semiconductor switch, the seventh semiconductor switch, and the ninth semiconductor switch at the ON state and maintain the fifth semiconductor switch, the sixth semiconductor switch, and the eighth semiconductor switch at the OFF state in a negative half-cycle of the buck mode of the transformerless, high-efficiency, three-level, high power density, wide input voltage range, single-phase three-level, buck-boost DC/AC inverter without the DC link capacitor, operate the fourth semiconductor switch and the eighth semiconductor switch at the high frequency, maintain the first semiconductor switch, the fifth semiconductor switch, and the sixth semiconductor switch at the ON state and maintain the second semiconductor switch, the third semiconductor switch, the seventh semiconductor switch, and the ninth semiconductor switch at the OFF state in a positive half-cycle of a boost mode of the transformerless, high-efficiency, three-level, high power density, wide input voltage range, single-phase three-level, buck-boost DC/AC inverter without the DC link capacitor, operate the fifth semiconductor switch and the ninth semiconductor switch at the high frequency, maintain the first semiconductor switch, the fourth semiconductor switch, and the seventh semiconductor switch at the ON state and maintain the second semiconductor switch, the third semiconductor switch, the sixth semiconductor switch, and the eighth semiconductor switch at the OFF state in a negative half-cycle of the boost mode of the transformerless, high-efficiency, three-level, high power density, wide input voltage range, single-phase three-level, buck-boost DC/AC inverter without the DC link capacitor, and turn the first semiconductor switch OFF in zero crossing regions of an AC voltage at an output to prevent capacitive leakage currents from flowing from the DC input power supply to the output.

2. The transformerless, high-efficiency, three-level, high power density, wide input voltage range, single-phase three-level, buck-boost DC/AC inverter without the DC link capacitor according to the claim 1, wherein the eighth semiconductor switch and the ninth semiconductor switch are diodes.

3. The transformerless, high-efficiency, three-level, high power density, wide input voltage range, single-phase three-level, buck-boost DC/AC inverter without the DC link capacitor according to the claim 1, wherein the eighth semiconductor switch and the ninth semiconductor switch are the MOSFETs or the IGBTs.

* * * * *